United States Patent
Fujisawa et al.

[11] Patent Number: 6,002,464
[45] Date of Patent: Dec. 14, 1999

[54] LIGHT DIFFUSING SHEET HAVING A LAYER INCORPORATED WITH LIGHT DIFFUSING MATERIAL AND A LAYER WITH A CORRUGATED SURFACE

[75] Inventors: Katsuya Fujisawa; Rikuji Watanabe; Ikuo Ohnishi; Katsuhiko Hayashi, all of Kurashiki, Japan

[73] Assignee: Kuraray Co., Ltd., Kurashiki, Japan

[21] Appl. No.: 08/853,179

[22] Filed: May 7, 1997

[30] Foreign Application Priority Data

May 13, 1996 [JP] Japan ................................. 8-117449

[51] Int. Cl.$^6$ ........................... G02F 1/1335; G02B 5/30; G02B 5/02

[52] U.S. Cl. ........................ 349/112; 349/64; 359/500; 359/599

[58] Field of Search ..................... 349/112, 64; 359/453, 359/500, 599

[56] References Cited

U.S. PATENT DOCUMENTS

| | | | |
|---|---|---|---|
| 4,268,127 | 5/1981 | Oshima et al. | 350/337 |
| 4,660,936 | 4/1987 | Nosker | 349/112 |
| 4,883,343 | 11/1989 | Teshirogi | 350/338 |
| 4,995,701 | 2/1991 | Brown | 349/112 |
| 5,196,960 | 3/1993 | Matsuzaki et al. | 359/453 |
| 5,394,255 | 2/1995 | Yokota et al. | 349/112 |
| 5,402,324 | 3/1995 | Yokoyama et al. | 349/112 |
| 5,457,572 | 10/1995 | Ishii et al. | 349/357 |
| 5,552,907 | 9/1996 | Yokota et al. | 349/112 |
| 5,584,556 | 12/1996 | Yokoyama et al. | 349/62 |
| 5,600,462 | 2/1997 | Suzuki et al. | 249/112 |
| 5,629,784 | 5/1997 | Abileah et al. | 349/112 |
| 5,694,186 | 12/1997 | Yanagawa et al. | 349/106 |
| 5,706,065 | 1/1998 | Yano | 349/96 |

FOREIGN PATENT DOCUMENTS

| | | |
|---|---|---|
| 296 01 195 | 5/1996 | Germany . |
| 57 210332 | 12/1982 | Japan . |
| 5-173134 | 7/1993 | Japan . |

OTHER PUBLICATIONS

Patent Abstracts of Japan, vol. 096, No. 005, May 31, 1996, JP 08–006160, Jan. 12, 1996.

*Primary Examiner*—William L. Sikes
*Assistant Examiner*—Kari M. Horney
*Attorney, Agent, or Firm*—Oblon, Spivak, McClelland, Maier & Neustadt, P.C.

[57] ABSTRACT

A light diffusing sheet including a clear film (#1) and two light diffusing layers (#2 and #3) formed consecutively thereon. The diffusing sheet is characterized in that the first light diffusing layer (#2) is a film of clear resin incorporated with a light-diffusing material, and the second light diffusing layer (#3) is a film of clear resin having a corrugated surface structure. The first light diffusing layer (#2) has a thickness of 10 μm to 500 μm and the light diffusing material has a weight concentration of less than 3%. The difference in refractive index between the clear resin and light diffusing material is $0.01 \leq \Delta n \leq 0.12$, and the average particle diameter of the light diffusing material is between 4 μm to 30 μm.

1 Claim, 3 Drawing Sheets

LIGHT DIFFUSING SHEET HAVING A LAYER INCORPORATED WITH LIGHT DIFFUSING MATERIAL AND A LAYER WITH A CORRUGATED SURFACE

BACKGROUND OF THE INVENTION

1. Field of the Invention

The present invention relates to a light-diffusing sheet to be used as a component of the screen of projection television or as a component of the liquid crystal display unit. The light-diffusing sheet permits one to watch clearly the image of a liquid crystal panel projected onto the front or rear side of the screen. Also, the light-diffusing sheet permits one to watch the image of a liquid crystal panel at a wider viewing angle.

2. Description of the Prior Art

The CRT projection television of conventional type is being replaced by another projection television of new type which is designed such that the image of a liquid crystal panel is projected onto a screen (from its front or rear side) and enlarged thereon by means of a projection lens. The rear-projection screen for such projection television is usually a lenticular lens sheet which is constructed of a clear plastic sheet and lenticular lenses formed thereon, as disclosed in Japanese Patent Laid-open No. 61120/1993 and others. The front-projection screen for such projection television usually has its surface coated with glass or plastic beads.

In the field of information machine such as personal computer and word processor, the liquid crystal display unit has come into general use recently. The liquid crystal used for the liquid crystal display unit is either of twisted nematic type (TN) or super twisted nematic type (STN). They poses a problem with narrow viewing angle. One way to address this problem is by installing a lens array on the viewer's side of the liquid crystal panel, thereby enlarging the image emanating from the liquid crystal panel, as disclosed in Japanese Patent Laid-open Nos. 25399/1978 and 65175/1981. Another way is by installing a light scattering plate in place of the lens array, as disclosed in Japanese Patent Laid-open Nos. 143791/1986 and 148430/1986.

A problem existing in the rear-projection screen provided with a lenticular lens sheet is with the occurrence of a moiré pattern, which depends on the intervals of lenticular lenses and the size of pixels in the liquid crystal panel. The smaller the pixels are, the more prone the moiré pattern is to occur. On the other hand, the beads-coated front-projection screen suffers the disadvantage that beads diffuse the projected light in random directions. So it is difficult to accomplish the desired viewing angles in both the horizontal and vertical direction.

The liquid crystal display unit consisting of a liquid crystal panel and a lens array placed thereon (toward the viewer) to enlarge the viewing angle poses a problem with the occurrence of a moiré pattern if the lens array has a large lens diameter. Since a moiré pattern occurs when there exists a particular relation between the intervals of the lens array and the dimensions of pixels of the liquid crystal panel, it is necessary that the lens diameter of the lens array should be smaller than the dimensions of pixels if the moiré pattern is to be avoided. However, such a lens array has to be small in size, and it would be very difficult to make a mold for it. A light scattering plate as a substitute for the lens array is easy to produce, but it has the disadvantage of scattering light outside the required viewing angle, thereby lowering the image contrast.

The present invention was completed in order to address the above-mentioned problems. Accordingly, it is an object of the present invention to provide a light-diffusing sheet which offers advantages in different application areas as follows. When used for the rear-projection television, it prevents the occurrence of a moiré pattern. When used for the front-projection television, it makes it possible to establish the viewing angle in the horizontal and vertical planes independently. When used for the liquid crystal display unit, it makes it possible to enlarge the viewing angle while preventing the image contrast from decreasing.

SUMMARY OF THE INVENTION

According to the present invention, the light-diffusing sheet is a laminate sheet composed of a clear film and two light-diffusing layers of clear resin formed thereon one over the other, the first light-diffusing layer containing a light-diffusing material therein and the second light-diffusing layer having a corrugated surface structure formed on the surface thereof. The light-diffusing sheet is schematically shown in section in FIG. 1. It is composed of a clear plastic film 1, a first light-diffusing layer 2, and a second light-diffusing layer 3, which are laminated on top of the other.

DESCRIPTION OF THE PREFERRED EMBODIMENTS

Figure 1:
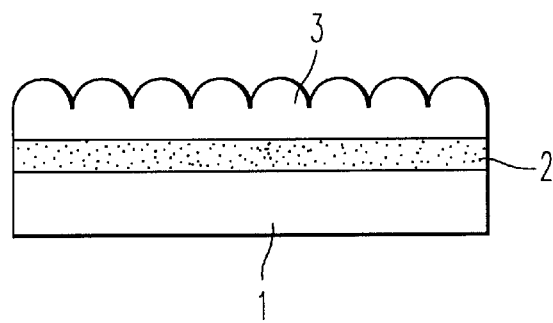
FIG. 1 is a sectional view showing an example of the light-diffusing sheet of the present invention.

The light-diffusing sheet of the present invention has two light-diffusing layers, one containing a light-diffusing material therein and the other having a corrugated surface structure formed on the surface thereof. It produces its light-diffusing effect owing to the light-diffusing material and the corrugated surface structure. The former diffuses light in both the horizontal and vertical directions, and the latter diffuses light only in one direction, such as the horizontal direction. Therefore, the light diffusing sheet permits the light to be diffused in the horizontal and vertical directions independently as desired if the amount of the light-diffusing material is properly controlled and the depth of the corrugated surface structure is also properly controlled. Since the first light-diffusing layer (containing the light-diffusing material) and the second light-diffusing layer (having the corrugated surface structure) are formed separately, there is no possibility that the light-diffusing material migrates to the surface, thereby forming minute irregularities on the corrugated surface structure. Therefore, the light-diffusing sheet does not produce unnecessary diffused light (which would exist if the light-diffusing material migrates to the surface) and hence does not decrease in diffusion by the corrugated surface structure.

The light-diffusing sheet of the present invention should preferably meet the conditions specified by the equation below.

$$10\ \mu m \leq t \leq 500\ \mu m$$

$$0.01 \leq \Delta n \leq 1.12$$

$$3\ wt\ \% \leq c$$

$$4\ \mu m \leq d \leq 30\ \mu m$$

where, t denotes the thickness of the first light-diffusing layer; Δn denotes the difference between the refractive index of the light-diffusing material in the first light diffusing layer and the refractive index of the clear resin of the first light-diffusing layer;

c denotes the concentration (by weight) of the light-diffusing material in the first light-diffusing layer; and d denotes the average particle diameter of the light diffusing material in the first light-diffusing layer.

The first light-diffusing layer should have a thickness in the range specified above, so that it is capable of satisfactory light diffusion. The first light-diffusing layer may be formed by the usual coating method such as spin coating. The clear resin and the light-diffusing material should have refractive indices whose difference is greater than 0.01 so that the light-diffusing sheet gives a good light-diffusing performance without the necessity of unduly increasing the amount of the light-diffusing material. The light-diffusing material in an excess amount increases the viscosity of the clear resin constituting the first light-diffusing layer to such an extent coating is difficult to carry out. This difficulty is avoided if the above-mentioned requirement is met. In addition, the difference between the two refractive indices should be smaller than 0.12, so that the first light-diffusing layer will not become transparent when the content of the light-diffusing material is low. Hot spot is prevented if the above-mentioned requirement is met. The first light-diffusing layer should contain the light-diffusing material in an amount more than 3 wt % so that it is capable of satisfactory light diffusion. Moreover, the light-diffusing material should have an average particle diameter larger than 4 μm, so that the light-diffusing sheet has good color temperature characteristics. Also, the light-diffusing material should have an average particle diameter smaller than 3 μm; this requirement is necessary for good light diffusion characteristics and easy coating in the usual way (such as spin coating).

The second light-diffusing layer has the corrugated surface structure as mentioned above. This structure should meet the condition specified by the equation below.

$$1\ \mu m \leq p \leq 600\ \mu m$$

where, p denotes the pitch of the corrugation. With a pitch larger than 1 μm, the light-diffusing layer is free from coloring due to light diffraction. With a pitch smaller than 600 μm, the light-diffusing layer does not produce a moiré pattern when the light diffusing sheet is used for a projection screen or a liquid crystal display unit. This results from the pitch size relative to the pixel size of the liquid crystal panel.

According to the present invention, the light-diffusing sheet should be prepared such that the first light-diffusing layer meets the above-mentioned requirements (for the layer thickness, the difference between indices, the concentration of the light-diffusing material, and the average particle diameter of the light-diffusing material) and the second light-diffusing layer also meets the above-mentioned requirement (for the pitch of the corrugated surface structure).

The clear film used for the light-diffusing sheet of the present invention may be a polarizing film. The light-diffusing sheet is formed from this polarizing film and two light-diffusing layers laminated thereon, the first layer containing the light-diffusing material and the second layer having the corrugated surface structure. When used for a projection-type screen, the light-diffusing sheet constructed in this way offers the advantage of improving the image contrast on the screen because the polarizing film absorbs part of the illuminating light which lowers the image contrast. In addition, when used for a liquid crystal display unit, it makes it possible to reduce the number of parts.

It is permissible to use a translucent material (having a slightly low transmission) for the clear film, the clear resin for the first light-diffusing layer, and the clear resin for the second light-diffusing layer. It is also possible to use a UV curable resin as the clear resin for the first and second light-diffusing layers. The corrugated surface structure formed on the second light-diffusing layer may have a section resembling sinusoidal wave, cycloidal wave, triangular wave, and trapezoidal wave. The corrugated surface structure may be formed in two dimensions (or in lattice pattern).

In the case where the above-mentioned light-diffusing sheet is used for the rear-projection screen, it is laminated onto a clear plate of plastics or glass, with the corrugated surface structure outside, by the aid of an adhesive or pressure-sensitive adhesive.

In the case where the above-mentioned light-diffusing sheet is used for the front-projection screen, it is laminated onto a supporting sheet of plastics, with the corrugated surface structure outside and a light reflecting layer (of aluminum or the like) interposed between the light-diffusing sheet and the supporting sheet.

The above-mentioned light-diffusing sheet may be used as a component of a liquid crystal display unit in combination with a light source, a first polarizing plate, a liquid crystal panel, and a second polarizing panel (arranged in the order mentioned), with the corrugated surface structure opposite to the liquid crystal panel. Since the light-diffusing particles are usually smaller in size than the pixels of the liquid crystal panel, the moiré pattern is less likely to occur if the intervals of corrugated surface structure is smaller than the pixel of the liquid crystal panel.

The above-mentioned light-diffusing sheet in which the clear film is a polarizing film may be used as a component of a liquid crystal display unit in combination with a light source, a polarizing plate, and a liquid crystal panel (arranged in the order mentioned), with the corrugated surface structure opposite to the light source. Having the light-diffusing layer formed on the surface of a polarizing film reduces the number of parts and facilitates the bonding to the liquid crystal panel, thereby simplifying the process of producing liquid crystal display units.

The invention will be described in more detail with reference to examples that follow.

EXAMPLE 1

According to the first embodiment of the present invention, the light-diffusing sheet is composed of a clear film 1, a first light-diffusing layer 2, and a second light-diffusing layer 3, as shown in FIG. 1. The clear film 1 is a triacetylcellulose (TAC) film, 190 μm thick. The first light-diffusing layer 2 is 100 μm thick and is formed on the surface of the clear film 1 by roll coating, followed by UV light irradiation, from a mixture liquid of UV-curable acrylic resin (as the clear resin) and 20 wt % of polystyrene beads (12 μm in diameter) as the light-diffusing material. The second light-diffusing layer is 50 μm thick and has a corrugated surface structure. It is formed on the surface of the first light-diffusing layer 2 by roll coating from the same UV-curable acrylic resin as mentioned above. The roll coating is followed by stamping with a nickel stamper on which a parallel corrugated pattern (with a round section) is formed. Stamping is accompanied by UV irradiation.

The advantage of the light-diffusing sheet in this example is that the light-diffusing material in the first light-diffusing layer does not disturb the corrugated surface structure of the second light diffusing layer. This produces the light diffusion as designed and eliminates the unnecessary light diffusion. In addition, the light-diffusing sheet in this example is capable of diffusing light in two directions independently owing to the corrugated surface structure. In other words, light is diffused more strongly in the direction perpendicular to the corrugated surface structure (right and left directions in FIG. 1) than in the direction parallel to the corrugation.

EXAMPLE 2

Figure 2:
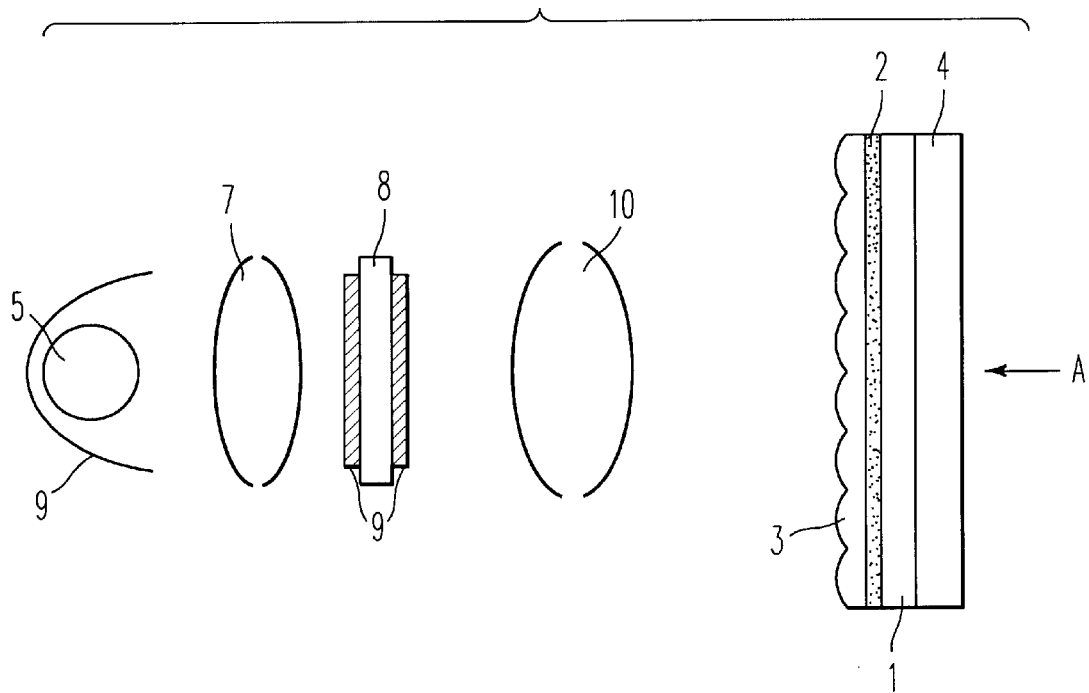
FIG. 2 is a schematic diagram showing an example of the projection type screen provided with the light-diffusing sheet.

This example demonstrates the application of the light-diffusing sheet to a rear-projection screen, as shown in FIG. 2. The projection screen is made up of the light-diffusing sheet (prepared in Example 1) and a 2-mm thick clear plate 4 of acrylic resin, which are bonded together. This screen is used as a component of a rear-projection television as shown in FIG. 2. This television is made up of a light source 5, a reflector 6, a lens assembly 7 to make emanating light parallel, a liquid crystal panel 8 (sandwiched between polarizing plates 9), and a projecting lens assembly 10 which enlarges and projects the image emanating from the liquid crystal panel 8. The light-diffusing sheet is positioned such that the corrugation on the surface of the second light-diffusing layer 3 is aligned with the direction in which the pixels of the liquid crystal panel 8 are arranged.

In the case of this rear-projection screen, the viewing angle is measured in the direction of arrow A in FIG. 2. It was found that the viewing angle differs depending on the direction; for example, 40° in the horizontal direction and 10° in the vertical direction. With this screen, it is possible to adjust the viewing angles as desired. No moiré pattern was observed.

EXAMPLE 3

Figure 3:
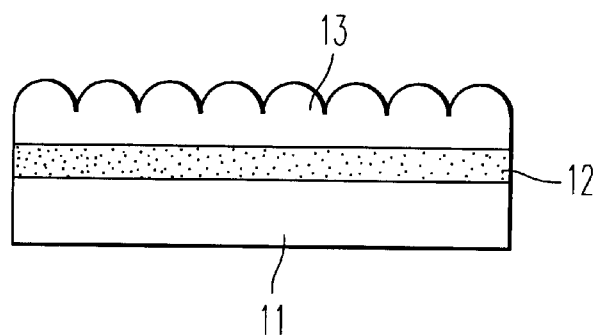
FIG. 3 is a sectional view showing another example of the light-diffusing sheet of the present invention.

The light-diffusing sheet as the third embodiment of the present invention is shown in FIG. 3. It is made up of a clear film 11 as the support, a first light-diffusing layer 12, and a second light-diffusing layer 13. The clear film 11 is a 188-$\mu$m thick polarizing film composed of a TAC film, a PVA (polyvinyl alcohol) film impregnated with iodine after uniaxial orientation, and a TAC film, which are laminated on top of the other. As in Example 1, the first light diffusing layer 12 is 100 $\mu$m thick and is formed on the surface of the polarizing film 11 by roll coating, followed by UV light irradiation, from a mixture liquid of UV-curable acrylic resin and 20 wt % of polystyrene beads (12 $\mu$m in diameter) as the light-diffusing material. The second light-diffusing layer is 50 $\mu$m thick and has a corrugated surface structure. It is formed on the surface of the first light-diffusing layer 12 by roll coating from the same UV-curable acrylic resin as mentioned above. The roll coating is followed by stamping with a nickel stamper on which a parallel corrugated pattern (with 100-$\mu$m pitch and 50-$\mu$m depth) is formed. Stamping is accompanied by UV irradiation. This light-diffusing sheet is capable of diffusing light in the horizontal and vertical directions independently as desired without unnecessary light diffusion.

EXAMPLE 4

Figure 4:
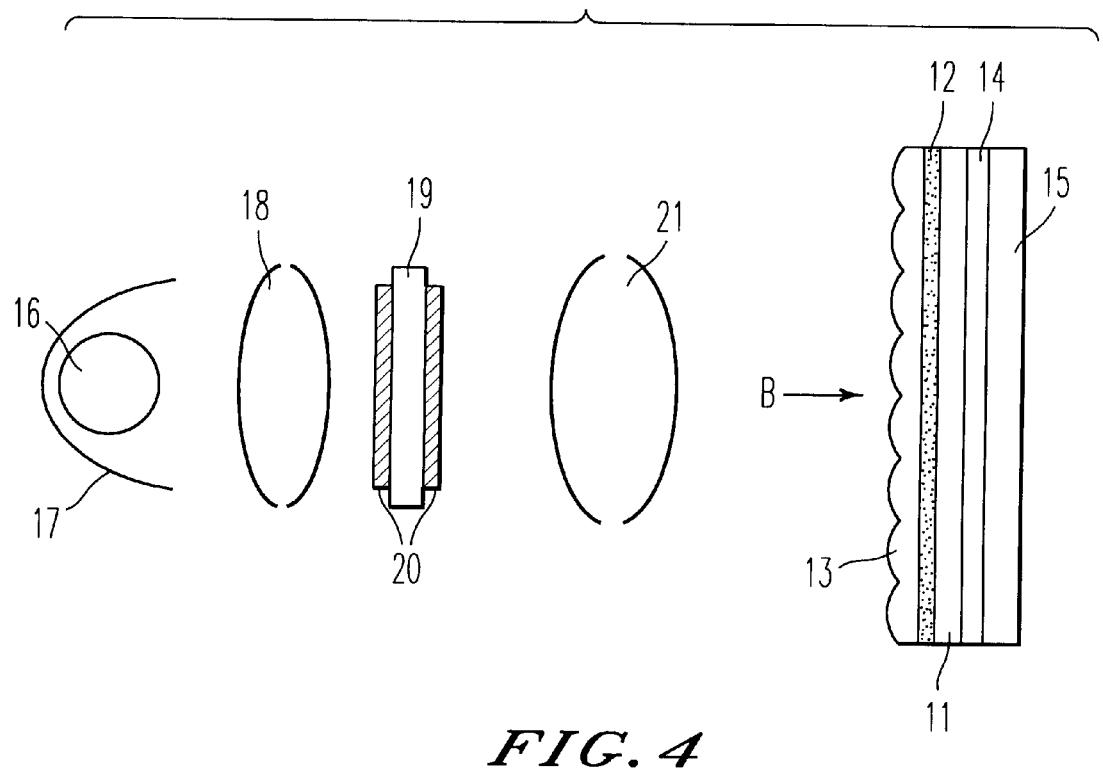
FIG. 4 is a schematic diagram showing another example of the projection type screen provided with the light-diffusing sheet.

The fourth embodiment of the present invention is a front-projection screen as shown in FIG. 4. It is made up of the light-diffusing sheet (prepared in Example 3), a reflecting layer 14 (of aluminum film), and a 1-mm thick supporting sheet 15 of polyvinyl chloride, which are bonded together. This projection screen was incorporated into a front-projection television as shown in FIG. 4. The television is made up of a light source 16, a reflector 17, a lens assembly 18, a liquid crystal panel 19 (sandwiched between polarizing plates 20), a projecting lens assembly 21, and the projection screen mentioned above. The light-diffusing sheet is positioned such that the corrugation on the surface of the second light-diffusing layer 13 is aligned with the direction in which the pixels of the liquid crystal panel 19 are arranged.

In the case of this front-projection screen, the viewing angle is measured in the direction of arrow B in FIG. 4. It was found that the viewing angle differs depending on the direction; for example, 40° in the horizontal direction and 10° in the vertical direction. With this screen, it is possible to adjust the viewing angles as desired. No moiré pattern was observed.

EXAMPLE 5

Figure 5:
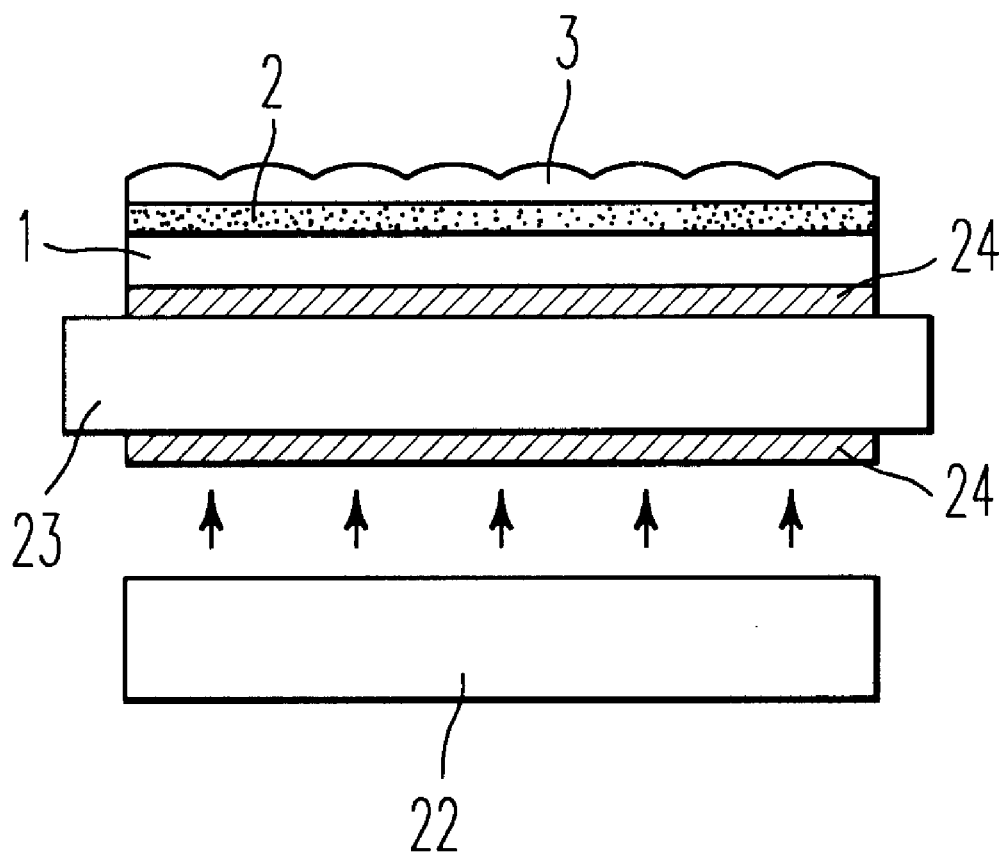
FIG. 5 is a schematic diagram showing an example of the liquid crystal display unit provided with the light-diffusing sheet.

The fifth embodiment of the present invention is a liquid crystal display unit as shown in FIG. 5. It is composed of a back-light 22, a liquid crystal panel 23 (sandwiched between polarizing plates 24), and the light-diffusing sheet (prepared in Example 1), with the last two being bonded together. The light-diffusing sheet is positioned such that the corrugation on the surface of the second light diffusing layer 3 is aligned with the direction in which the pixels of the liquid crystal panel 23 are arranged.

Owing to the light-diffusing sheet, the liquid crystal display unit has viewing angles of 46° and 17° in the horizontal and vertical directions, respectively. The liquid crystal display unit without the light diffusing sheet has viewing angles of 30° and 12° in the horizontal and vertical directions, respectively.

Effect of the invention: The light-diffusing sheet of the present invention permits the light diffusion to be established in the horizontal and vertical directions independently. It can be used for the rear-projection screen without the occurrence of moiré pattern. It can also be used for the front-projection screen which permits the viewing angles to be established in the horizontal and vertical directions independently. Furthermore, it can be used for the liquid crystal display unit to increase its viewing angle without causing moiré patterns and decreasing contrast.

What is claimed is:

1. A light-diffusing sheet, comprising:

a clear film;

a first light-diffusing layer formed on said clear film; and
   a second light-diffusing layer formed on said first light-diffusing layer;

wherein the first light-diffusing layer is a film of clear resin having a light-diffusing material dispersed therein, the second light-diffusing layer is a film of clear resin having a corrugated surface configured to diffuse light in a single direction, said second light-diffusing layer being formed on said first light-diffusing layer, and $10 \ \mu m \leq t \leq 500 \ \mu m$ $$0.01 \leq \Delta n \leq 0.12$$

$$3 \text{ wt \%} \leq c$$

$$4 \text{ }\mu\text{m} \leq d \leq 30 \text{ }\mu\text{m}$$

where t denotes the thickness of the first light-diffusing layer; $\Delta n$ denotes the difference between the refractive index of the light-diffusing material in the first light-diffusing layer and the refractive index of the clear resin of the first light-diffusing layer; c denotes the concentration (by weight) of the light-diffusing material in the first light-diffusing layer; and d denotes the average particle diameter of the light-diffusing material in the first light-diffusing layer.

* * * * *